United States Patent [19]
Beitel

[11] Patent Number: 5,905,508
[45] Date of Patent: May 18, 1999

[54] METHOD AND SYSTEM FOR DYNAMICALLY PLOTTING AN ELEMENT ON AN IMAGE USING A TABLE

[75] Inventor: David Alan Beitel, Seattle, Wash.

[73] Assignee: Microsoft Corporation, Redmond, Wash.

[21] Appl. No.: 08/831,734

[22] Filed: Apr. 1, 1997

[51] Int. Cl.⁶ .................................................. G06F 15/00
[52] U.S. Cl. .......................................................... 345/440
[58] Field of Search .................................... 345/435, 440, 345/441, 442

[56] References Cited

U.S. PATENT DOCUMENTS 4,737,916  4/1988  Ogawa et al. ........................ 364/443
4,847,788  7/1989  Shimada .............................. 364/522
5,185,808  2/1993  Cok ...................................... 382/1

Primary Examiner—Phu K. Nguyen
Attorney, Agent, or Firm—Jones & Askew, LLP

[57] ABSTRACT

A method and system for dynamically plotting an element on an image using a table. A page background is created using the image. A table is created containing the element. The table contains a first buffer row, an element row and a second buffer row. The first buffer row positions the element in the table. The element row displays the element and the second buffer row positions any additional characters on the page below the image. The element is overlaid on the image by displaying the table containing the element over the page background containing the image.

19 Claims, 7 Drawing Sheets

METHOD AND SYSTEM FOR DYNAMICALLY PLOTTING AN ELEMENT ON AN IMAGE USING A TABLE

FIELD OF THE INVENTION

The present invention relates in general to plotting an element on an image, and more particularly to dynamically plotting an element on an image using a table.

BACKGROUND OF THE INVENTION

The location of an element within an area may be described graphically by plotting the element on an image of the area or in writing by describing the location of the element using text. It is generally easier to comprehend a graphical description of the location of an element than a textual description of the location of an element. For example, the location of a building may be described by a map showing the location of the building or may be described by an address for the building. It is easier to obtain information about the location of a building using a map than using an address, especially if the building is located in an unfamiliar area. Another advantage of using a map is that a map conveys information about the surrounding area which an address may not convey. A map may show that a building is located near a landmark, whereas, an address may not indicate that a building is located near a landmark.

The location of a business may be a critical factor in a consumer's decision to patronize the business. For example, location is usually important to a traveler when selecting a hotel. A business traveler may desire a hotel located near an airport or near a customer's place of business. A recreational traveler may desire a hotel located near a beach or near a theme park. An address may not help a traveler select a hotel located near a landmark because an address may not convey information about the area surrounding the hotel. However, a map may help a traveler select a hotel located near a landmark because a map conveys information about the location of the hotel as well as the surrounding area. Ideally, a traveler may evaluate the location of a hotel by viewing the hotel plotted on a map of the area before the traveler makes a reservation at the hotel.

For any given area, there may be a number of hotels within the area. By viewing the locations of the different hotels within the area, a traveler may select a hotel based upon location. However, if there are a large number of hotels within the area, a traveler may wish to view only the locations of those hotels which provide certain amenities or which fall within a certain price range. The hotels within the area may be filtered by eliminating the hotels that do not provide the amenities specified by the traveler and the hotels that do not fall within the price range specified by the traveler. The traveler may view each of the remaining hotels on a map of the area to select a hotel based on location, amenities and price. A method for quickly filtering hotel data and a method for quickly and accurately plotting hotels on a map are needed so that the traveler can evaluate hotels based upon location, amenities and price.

The data for the location, amenities and price of a hotel, as well as the data for a map of the area may be available on a network such as the Internet. In a networked environment, the data for an element such as a hotel may be stored in a remote memory storage device. Similarly, the data for an image such as a map may be stored in a remote memory storage device. In a networked environment, the program modules for plotting an element on an image are distributed between a client and a server. Current technologies for distributing program modules for plotting an element on an image between a client and a server include server technology, client technology, and client-server technology.

In any of the current technologies, the client sends a request to a server to plot an element on an image. In response to the request from the client, the server obtains data for the element and the image from a remote memory storage device. To plot an element on an image using server technology, the server uses the data for the element and the image to create a new image. Once the new image is created, the server sends the new image to the client. The client displays the new image using a program module commonly referred to as browsing software. An advantage of server technology is that the new image is independent of the browsing software used by the client. Another advantage of server technology is that only the new image is sent to the client. The client does not receive the code to generate the new image because the new image is created by the server. A disadvantage of server technology is that there is a significant delay between the plotting request and the display of the element plotted on the image. The delay is due to the server performance required to generate and send a new image. A new image is used for each element plotted on the image.

Client technology shifts the performance requirement from the server to the client. To plot an element on an image using client technology, the client downloads the element data and the image data from the server. The client also downloads a program module to plot an element on an image. The image is created and the element is plotted on the image by the client using the downloaded program module. An advantage of client technology is that once the data and the program module have been downloaded by the client, the element may be quickly plotted on the image. A disadvantage of client technology is that a lengthy delay is incurred when the client downloads the data and the program module. Another disadvantage of this technology is that the program module to plot an element on an image may only operate with certain operating systems or browsing software.

Client-server technology is a mixture of client technology and server technology. The program module to plot an element on an image resides in the client and data for the element and the image reside in the server. An advantage of client-server technology is that client download time and server performance time are reduced. A disadvantage of this technology is that it may not be platform independent. A modified client-server technology is needed which retains the advantages of the current client-server technology and is independent of the platform used by the client.

Accordingly, there is a need for a method and system for dynamically plotting an element on an image quickly and accurately.

SUMMARY OF THE INVENTION

The present invention satisfies the above-described needs by using a table and a background to dynamically plot an element on an image. Generally described, the present invention provides a method and system for dynamically plotting an element on an image using a table and a background. A background is created using the image and a table is created containing the element. To plot the element on the image, the table is displayed over the background. Different elements may be plotted on the image by creating different tables. In addition, multiple elements may be plotted on the image by creating more complex tables. Since the image remains the same, there is no need to regenerate the background to plot additional elements.

An example of plotting an element on an image is plotting a building such as a hotel on a map. Another example of plotting an element on an image is plotting a storm on a map. Although a map may be used as the image, the image is not limited to a map. The image may be a mechanical assembly and the element may be a pointer to a particular piece of the assembly. The image may also be a site plan and the element may be a proposed building design for the site.

To plot an element on an image, a background is created using the image. The present invention provides two embodiments for creating a background. In the first embodiment, the background is a page background. In the second embodiment, the background is a table background. To create a page background, the image is positioned at a predetermined offset within the page background and the area of the page background outside the image is filled with background filler. To create a table background, the image is specified as the background for the table.

To plot an element on an image using a table and a background, a table containing the element is created. The table is sized to match the size of the image. Preferably, the table contains a first buffer row, an element row and a second buffer row. The second buffer row may contain an element label. Each row contains a first cell, a second cell and a third cell. The dimensions of the cells of the table are determined by the plotting coordinates for the element and the dimensions of the image. The plotting coordinates for the element include a horizontal coordinate and a vertical coordinate. The first buffer row positions the element on the image. The first cell of the first buffer row has a width determined by the horizontal coordinate for the element and a height determined by the vertical coordinate for the element. A transparent image is displayed in the first cell of the first buffer row. The size of the transparent image is selected so that the element is properly positioned on the image. The third cell of the buffer row has a width determined by the difference between the width of the table and the widths of the first cell and the second cell.

The element row contains the element. The element is displayed in the second cell of the element row. The second buffer row provides a transparent buffer between the element and the bottom of the image. The height of the second buffer row is determined by the image height, the vertical coordinate for the element, and the height of the element. The element label row contains the label for the element. The element label is displayed in a table in the second cell of the element label row.

To plot an element on the image using a page background, the table containing the element is displayed over the page background containing the image. The predetermined offset used to create the page background insures that the table and the image are perfectly aligned. To plot the element on the image using a table background, the image is specified as the background for the table and the table is displayed.

In the embodiment using a page background, a second element may be plotted on the image without regenerating the page background. To plot a second element on the image, a table is created containing the second element. Preferably, the table contains a first buffer row, an element row, and a second buffer row. The second element is contained in the element row and a label for the second element is contained in the element label row. To plot the second element on the image, the table for the original element is removed so that the table for the second element may be displayed over the page background.

The present invention may be implemented in a networked environment with a client and a server. To optimize plotting performance, the page background and the table are created by the server and transferred to the client for display by the client. The client caches the page background so that additional elements may be plotted on the image without another image request. Preferably the server creates the table using a programming language capable of creating hypertext-enabled documents such as hypertext markup language ("HTML"). HTML provides a table element which may be used to create the table containing the element. Preferably, the client displays the HTML table using browsing software.

These and other aspects, features and advantages of the present invention may be more clearly understood and appreciated from a review of the following detailed description of the disclosed embodiments and by reference to the appended drawings and claims.

DETAILED DESCRIPTION

The present invention is directed toward a method and system for dynamically plotting an element on an image using a table. In one embodiment, the invention is incorporated into a travel service program entitled "EXPEDIA", marketed by Microsoft Corporation of Redmond, Wash. Briefly described, the program allows a user to select a hotel based upon amenities, price, and location. The user may view the locations of the hotels that meet the user's amenities and price requirements on a map. In addition, the user may identify hotels within a user-defined region of the map. The user may also identify the hotel(s) located closest to a user-defined point of the map.

Exemplary Operating Environment

Figure 1:
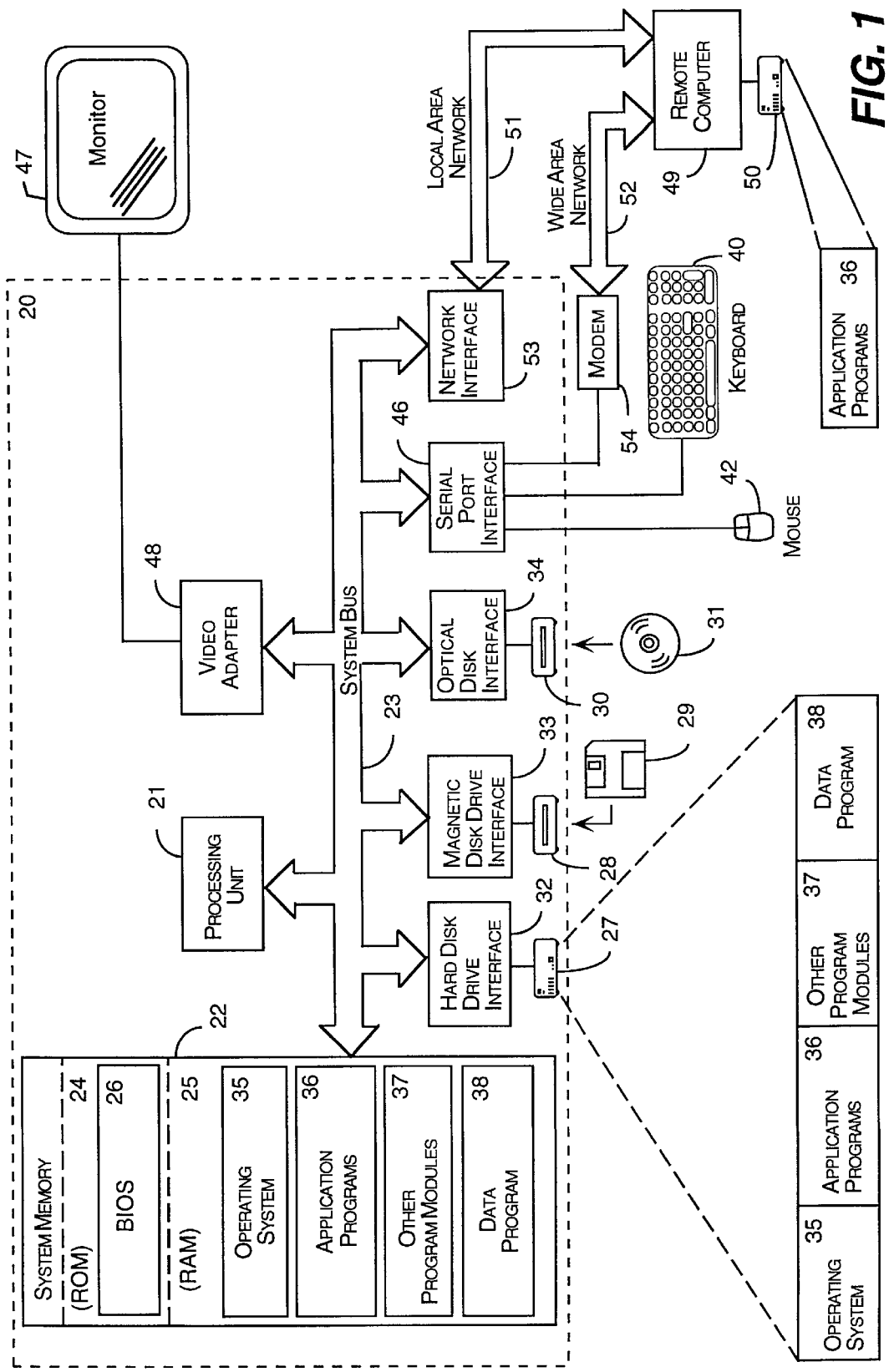
FIG. 1 is a block diagram of a personal computer illustrating the operating environment for an embodiment of the present invention.

FIG. 1 and the following discussion are intended to provide a brief, general description of a suitable computing environment in which the present invention may be implemented. While the present invention will be described in the general context of a distributed computing environment, those skilled in the art will recognize that the invention also may be implemented in other environments. In a distributed computing environment, tasks are performed by remote processing devices that are linked through a communications network. Program modules may be located in both local and remote memory storage devices. Generally, program modules include routines, programs, components, data structures, etc. that perform particular tasks or implement particular abstract data types. The invention may also be practiced in the context of an application program that runs on an operating system in conjunction with a personal computer or in combination with other program modules. Moreover, those skilled in the art will appreciate that the invention may be practiced with other computer system configurations, including hand-held devices, multiprocessor systems, microprocessor-based or programmable consumer electronics, minicomputers, mainframe computers, and the like.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Embodiments of the Present Invention

The present invention provides a method for dynamically plotting an element on an image. The method for dynamically plotting an element on an image may be used to determine the location of an element within an image. For example, if the element is a hotel and the image is a map, then the location of a hotel may be determined by plotting the hotel on a map. An element may be plotted on an image by creating a background containing the image and creating a table containing the element. In the disclosed embodiments, the generation of the background containing the element is separate from the generation of the table to overlay the element. By separating the steps of creating the background from the steps of creating the table, additional elements may be plotted on the image without regenerating the image. Two preferred embodiments of the present invention are described. The first embodiment uses a page background to display the image and the second embodiment uses a table background to display the image.

Dynamically Plotting an Element on an Image Using a Table and a Page Background

The first embodiment for dynamically plotting an element on an image uses a table and a page background. A table is created which contains the element and a page background is created which contains the image. The table is used to overlay the element on the page background so that the element is plotted on the image.

The page background is a background for a page of an electronic document. The size of the page background is typically selected so that the page background will completely fill the screen of the display device. If the page background does not fill the screen, then the program module which displays the page background may repeat the page background until the screen is filled. If the page background is repeated then the image contained in the page background may appear multiple times on the screen. To prevent the display of multiple images, the page background is defined so that it completely fills the screen of the display device.

In the preferred embodiment, the page background is 1024 screen pixels wide by 1024 screen pixels high and the image is 450 screen pixels wide by 375 screen pixels high. The image is positioned at a predetermined offset within the page background. The predetermined offset is specified as a pair of screen pixel coordinates. The pair of screen pixel coordinates specifies the number of horizontal screen pixels and the number of vertical screen pixels the image is offset from the upper left-hand corner of the page background. In the preferred embodiment, the predetermined offset is 10 horizontal screen pixels and 15 vertical screen pixels. As explained in more detail below, the predetermined offset is selected so that the image in the page background and the table containing the element are perfectly aligned. Once the image is positioned at the predetermined offset, the area of the page background outside of the image is filled with background filler. The background filler may be a color or a pattern or even an image. In the preferred embodiment, the background filler is a solid color.

Figure 2:
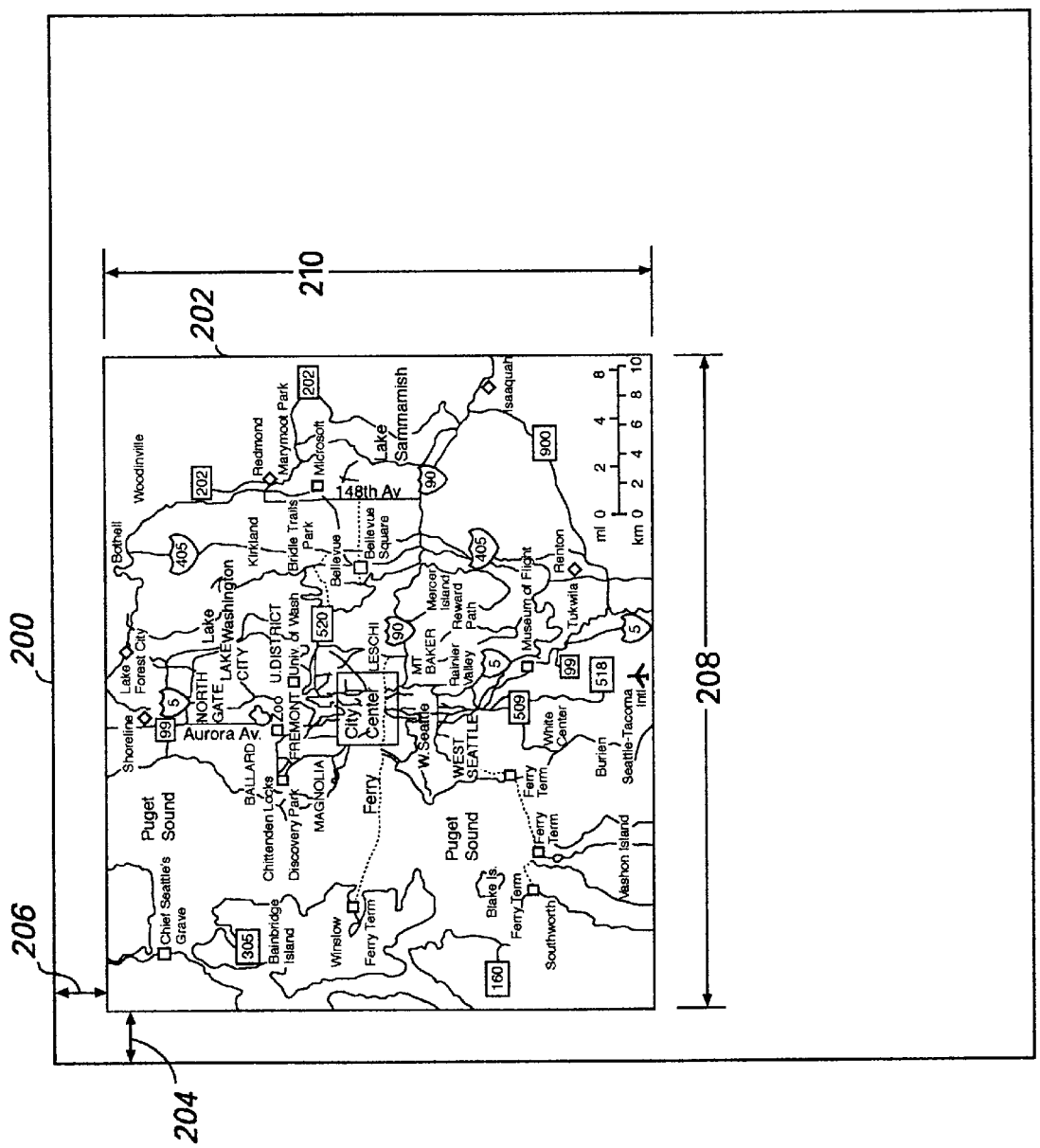
FIG. 2 is an illustration of a page background using an image generated by an embodiment of the present invention.

An example of creating a page background using an image is shown in FIG. 2. The image 202 shown in FIG. 2 is a map of the Seattle area. The dimensions of the image include an image width 208 and an image height 210. The image 202 is placed at a predetermined offset 204, 206 within the page background 200. The predetermined offset is defined by a pair of screen pixel coordinates. The first screen pixel coordinate corresponds to the horizontal offset 204 and the second screen pixel coordinate corresponds to the vertical offset 206. The area of the page background 200 outside of the image 202 is filled with a background filler. The background filler shown in FIG. 2 is a solid color.

After the page background is created, a table is created containing the element. The table is arranged in rows and columns with each row containing the same number of columns or cells. The table is transparent so that the page background is displayed through the table. Only the items contained in the cells of the table are displayed over the page background. Preferably, the table includes a first buffer row, an element row, and a second buffer row. Each row of the table contains three cells. The size of the cells of the table are defined using the plotting coordinates for the element and the dimensions of the image. The plotting coordinates for the element include a horizontal coordinate and a vertical coordinate. The horizontal and vertical coordinates for the element describe the location of the element in the image by specifying the location of the element relative to the upper left-hand corner of the image.

Figure 3:
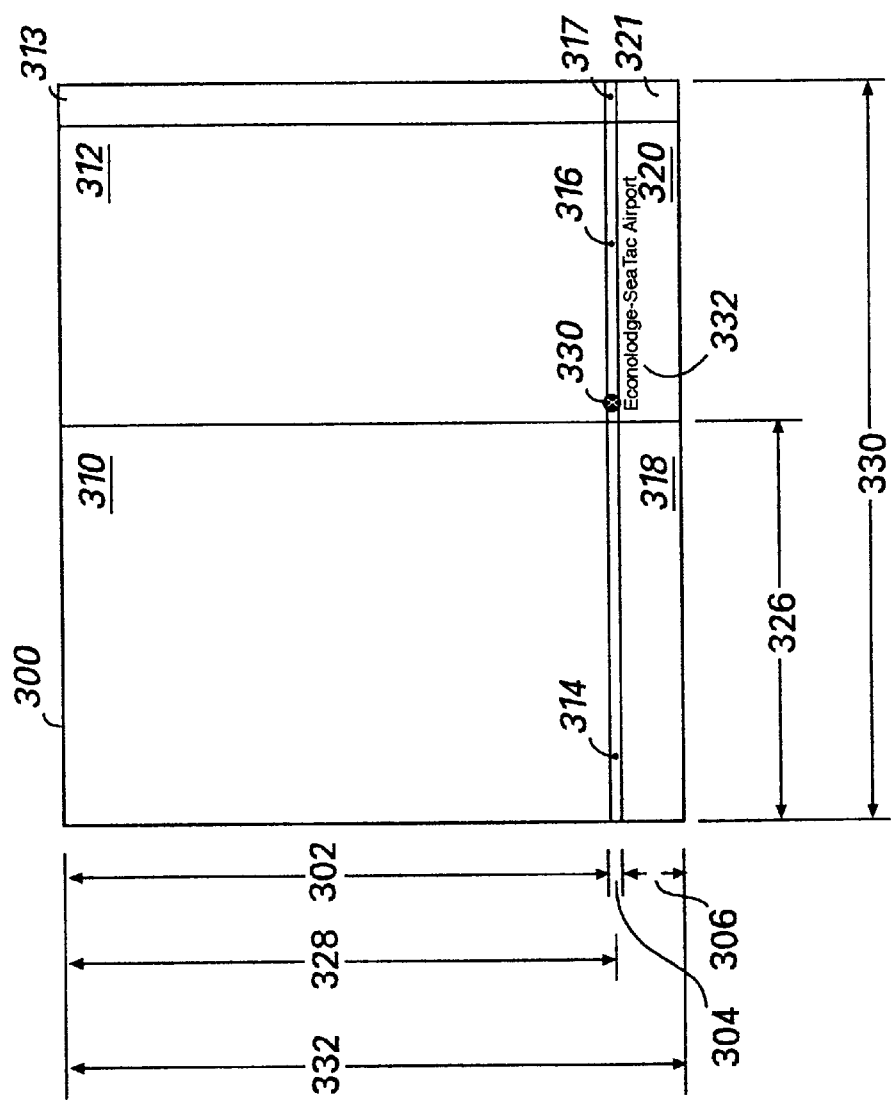
FIG. 3 is an illustration of a table containing an element generated by an embodiment of the present invention.

FIG. 3 illustrates the creation of a table 300 for overlaying an element on an image. The table is sized so that the width of the table 330 and the height of the table 332 are equal to the width of the image 208 and the height of the image 210 respectively. The table 300 contains a buffer row 302, an element row 304 and a second buffer row 306. Each row contains three cells, a first cell, a second cell and a third cell. All cells within a row are the same height. All the first cells of the table are the same width. Similarly for the second cells and the third cells. The first buffer row 302 positions an icon for the element 330 in the table so that the element icon 330 will appear at the correct location on the image. The size of the first cell 310 of the first buffer row 302 is determined by the plotting coordinates for the element. The width of the first cell 310 of the first buffer row 302 is determined by the horizontal coordinate 326 for the element. In the preferred embodiment, if the upper left-hand coordinate for the image is (1, 1), then the formula for determining the width of the first cell 310 of the first buffer row 302 is: the greater of 0 and (horizontal coordinate for element)—½ (width of element icon)—1. This formula is used so that the element icon 330 is horizontally centered on the point of the image where the element is located. The height of the first cell 310 of the first buffer row 302 is determined by the vertical coordinate 328 for the element. In the preferred embodiment, if the upper left-hand coordinate for the image is (1, 1), then the formula for determining the height of the first cell 310 of the first buffer row 302 is: the greater of 0 and (vertical coordinate for element)—½ (height of element icon)—1. This formula is used so that the element icon 330 is vertically centered on the point of the image where the element is located. A transparent image is displayed in the first cell 310 of the first buffer row 302. The transparent image is sized so that the width of the transparent image is equal to the width of the first cell of the first buffer row calculated by the formula.

Preferably, the width of the second cell 312 of the first buffer row 302 is defined by the width of the second cell 320 of the second buffer row 306 or the second cell of the element row 304. The width of the third cell 313 of the first buffer row 302 is defined by width of the table and the widths of the first cell 310 and the second cell 312 of the first buffer row 302. The width of the third cell 313 is the difference between the width of the table 330 and the widths of the first cell 310 and the second cell 312. The third cell 313 is empty.

Below the first buffer row 302 is the element row 304. The element row 304 displays an icon 330 for the element on the image. The first cell 314 of the element row 304 is empty. The width of the first cell 314 of the element row 304 is equal to the width of the first cell 310 of the first buffer row 302. The second cell 316 of the element row 304 contains an icon 330 for the element. The height and the width of the second cell 316 of the element row 304 are determined by the height and the width of the element icon 330 respectively. Alternatively, if the second buffer row 306 contains an element label, then the width of the second cell 316 of the element row 304 is determined by the width of the second cell 320 of the second buffer row 306. The third cell 317 of the element row 304 is empty. The width of the third cell 317 of the element row 304 is equal to the width of the third cell 313 of the first buffer row 302.

Following the element row 304 is the second buffer row 306. The second buffer row 306 provides a transparent buffer between the element and the bottom of the image. The second buffer row 306 may also display a label 332 for the element below the element icon 330. The first cell 318 of the second buffer row 306 is empty. The width of the first cell 318 of the second buffer row 306 is equal to the width of the first cell 310 of the first buffer row 302. The height of the second cell 332 of the element label row 306 is determined by the height of the image 332, the vertical coordinate for the element 328 and the height of the element. In the preferred embodiment, if the upper left-hand coordinate for the image is (1, 1), the formula for the height of the second cell 332 of the element label row is: (height of image)—(height of first cell of buffer row)—(height of element icon).

The second cell 320 of the second buffer row 306 may contain an element label which contains the element label 332. The second cell of the element label row contains a second table. The element label table is a one row, one cell table. The element label is contained in the single cell second table. The element label table is positioned at the top of the second cell 316 so that the label 332 appears directly delow teh element icon 330. The third cell 321 of the element label row 306 is empty.

Figure 4:
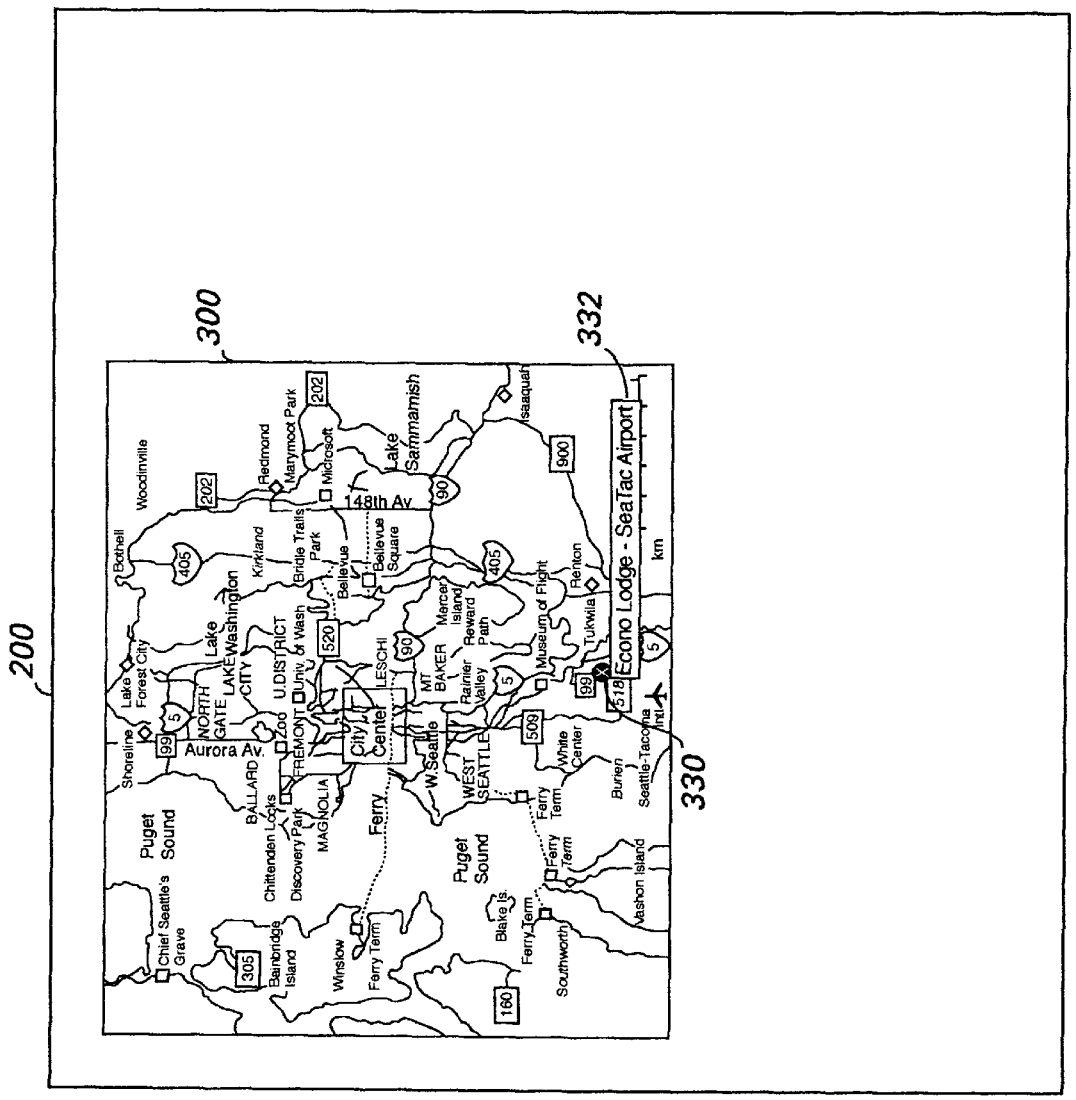
FIG. 4 is an illustration of the table of FIG. 3 displayed over the page background of FIG. 2 generated by an embodiment of the present invention.

To overlay the element on the page background, the table is displayed over the page background. FIG. 4 shows the table 300 of FIG. 3 displayed over the page background 200 of FIG. 2. The upper left-hand corner of the table is positioned so that it is aligned with the upper left-hand corner of the image. In the representative example described by this application, the image is a map and the element is an icon representing the location of a hotel on the map. Nevertheless, the present invention is not limited to plotting a hotel icon on a map. The present invention may be readily extended to plotting any element on any type of image.

Figures 5, 6:
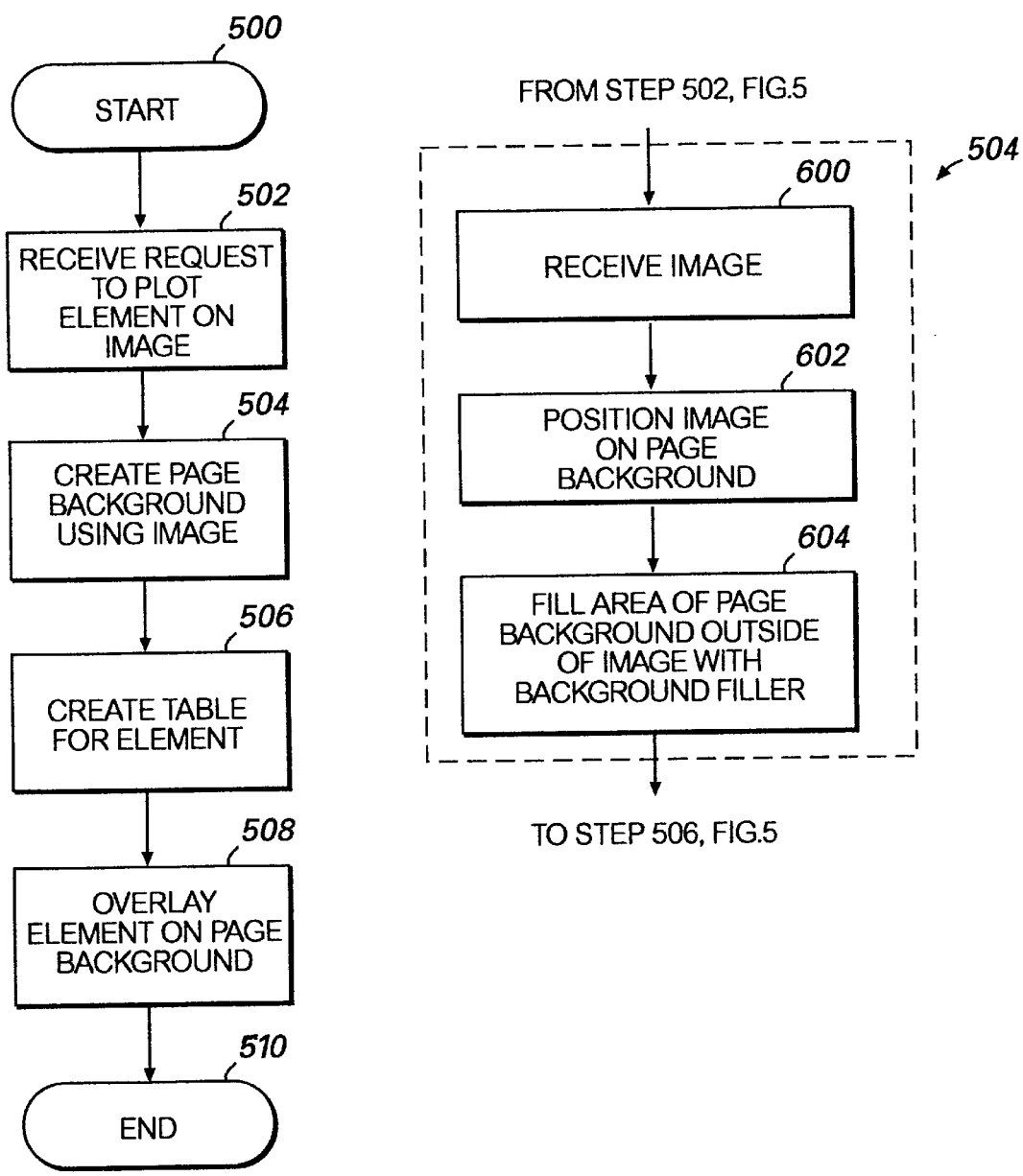
FIG. 5 is a logical flow diagram illustrating the steps for plotting an element on an image using a table.
FIG. 6 is a logical flow diagram illustrating the steps for creating a page background using an image.

FIG. 5 is a logical flow diagram illustrating the steps of plotting an element on an image using a table and a page background. The method begins at the START task of step 500 and proceeds to step 502 to receive a request to plot an element on an image. In step 504, a page background is created using the image. FIG. 6 illustrates the steps for creating a page background using an image. The image is received in step 600 and the image is placed at a predetermined offset within the page background in step 602. In step 604, the remaining area of the page background is filled with background filler.

Figures 7, 9:
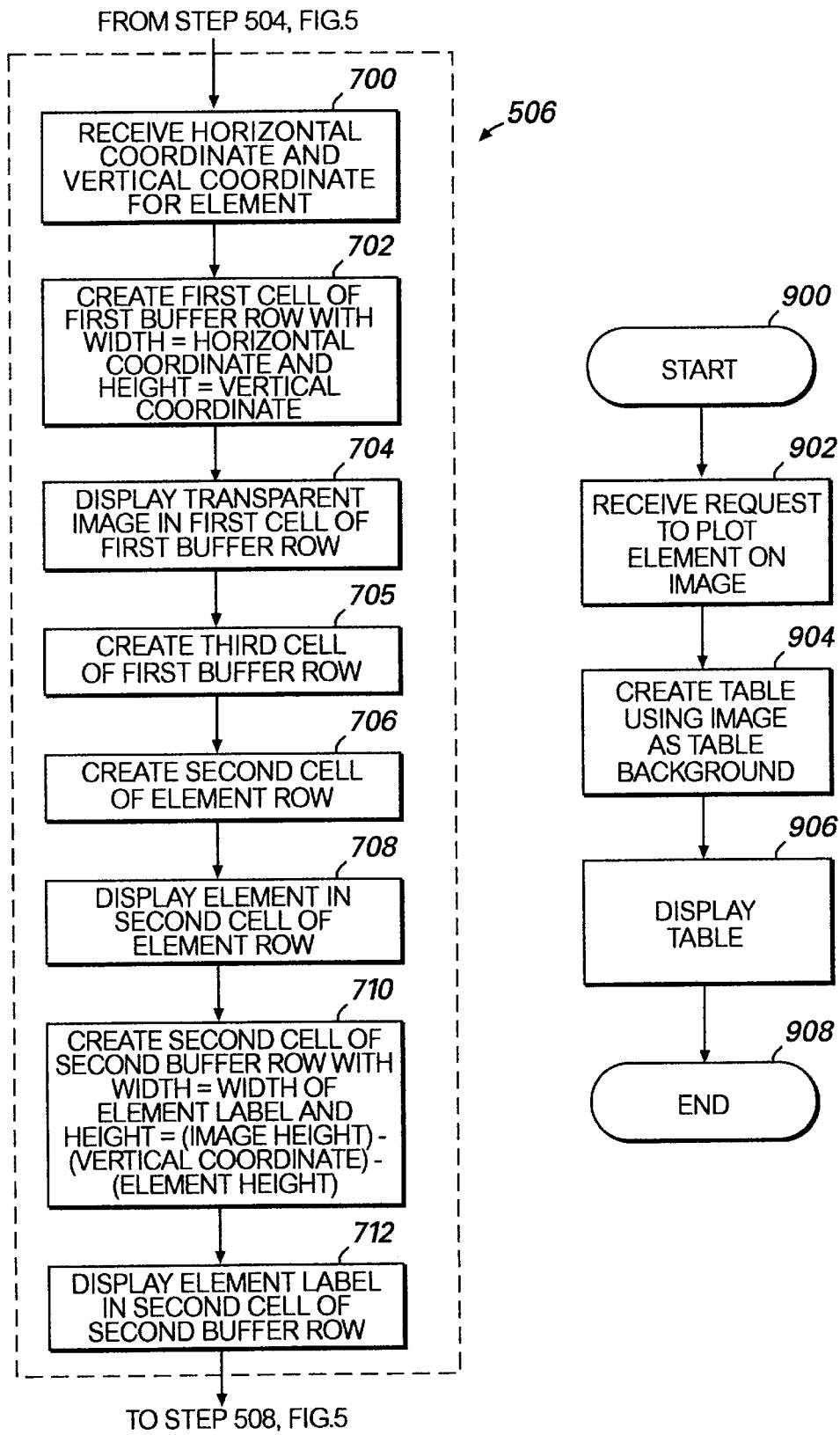
FIG. 7 is a logical flow diagram illustrating the steps for creating a table containing an element.
FIG. 9 is a logical flow diagram illustrating the steps for creating a table using an image as the background for the table.

Returning to FIG. 5, after the page background is created in step 504, the method proceeds to step 506. In step 506, a table containing the element is created. The size of the table is selected so that the table is the same size as the image. The table contains a first buffer row, an element row and a second buffer row. An element label may be displayed in the second buffer row. The steps for creating a table containing the element are illustrated by FIG. 7. In step 700, the plotting coordinates for the element, including a horizontal coordinate and a vertical coordinate, are received. The horizontal coordinate and the vertical coordinate describe the location of the element relative to the upper left-hand corner of the image. The horizontal coordinate and the vertical coordinate are used to determine the size of the first cell of the first buffer row of the table in step 702. The width of the first cell of the first buffer row of the table is determined by the horizontal coordinate for the element. The height of the first cell of the first buffer row is determined by the vertical coordinate for the element. A transparent image with a width equal to the width of the first cell and a height equal to the height of the first cell is displayed in the first cell of the first buffer row in step 704. The third cell of the first buffer row is created in step 705. The third cell of the first buffer row is used to insure that the width of the table matches the width of the image. The width of the third cell of the first buffer row is determined by the width of the image and the widths of the second and third cells of the table.

The element row is located directly below the first buffer row and displays an icon for the element. The second cell of the element row is created in step 706. The height of the second cell of the element row is determined by the height of the element icon. The width of the second cell of the element row is determined by the greater of the width of the element icon or the width of the element label. In step 708, the element icon is displayed in the second cell of the element row. The element icon is displayed at the point on the image where the element is located.

The second buffer row follows the element row and provides a transparent buffer between the element and the bottom of the image. The second buffer row may also display a label for the element icon. The second cell of the second buffer row is created in step 710. The height of the second cell of the second buffer row is determined by the difference between the height of the image and the heights of the first buffer row and the element row. An element label may be displayed in the second cell of the second buffer row. If an element label is displayed, then the element may be displayed using an element label table. The element label table is placed in the second cell of the second buffer row and is aligned at the top of the cell. The element label table has one row and one cell. The size of the element label table is determined by the size of the element label. After the page background and the table are created, the method proceeds to display the table over the page background in step 508 of FIG. 5. The method for plotting an element on an image using a table and a page background terminates at the END task of step 510.

The first embodiment of the method for plotting an element on an image using a table may be implemented in a networked environment using a personal computer 20 operating as a client and a remote computer 49 operating as a server. The preferred embodiment uses a programming language capable of creating hypertext-enabled documents. Hypertext-enabled documents are documents with automatic links to other documents and are generally written in a hypertext markup language ("HTML"). HTML is a document layout and hypertext link ("hyperlink") specification language. In other words, HTML defines the structure and appearance of hypertext-enabled documents and provides a distribution system for creating and sharing these documents, which are linked to other documents, over computer networks such as the Internet. Hypertext-enabled documents may be displayed by a client using browsing software. An example of browsing software is the "INTERNET EXPLORER" program, marketed by Microsoft Corporation of Redmond, Wash.

HTML defines the syntax and placement of special, embedded directions or HTML code elements, that are not displayed by the browsing software. These HTML code elements tell the browsing software how to display the contents of the hypertext-enabled document, including text and images by defining discrete regions of the hypertext-enabled document. Generally, the hypertext-enabled document will have HTML code elements, preferably called tags, defining the head of the document (<HEAD>. . . </HEAD>) and the body of the document (<BODY>. . . </BODY>). The body of the document usually contains the main substance of the document. The body may contain an HTML table defined by an HTML table element (<TABLE>. . . </TABLE>).

An HTML table is an HTML 3.2 standard element which is laid out in rows and columns of cells, similar to a conventional spreadsheet. Basically, each cell in the table contains data or cell content, preferably in the nature of an HTML code element. The layout and content of the cells in a table are defined from left to right and top to bottom, according to the convention defined by HTML 3.2. Examples from the preferred embodiment of the contents of a cell include the icon for a hotel or the label for a hotel. Essentially, HTML uses images, such as the image of the hotel icon, for content as if the image was some kind of special large character. The HTML code elements are written into a stream in a specific order that defines the layout and content of each cell in the table. This stream is generally stored in an HTML file that maintains the hypertext-enabled document.

One of the features of HTML is the ability to define hyperlinks. Hyperlinks give the user the ability to seamlessly retrieve and display a different document that resides at a unique address called a universal resource locator ("URL") on the computer network. Hyperlinks within hypertext-enabled documents can be represented by images, preferably using the <IMG> tag. Hyperlink images preferably use a standard graphical image format such as Graphics Interchange Format ("GIF").

In the first embodiment, the image is preferably a GIF file that may be stored in a remote storage device. The server downloads the image GIF file and creates the page background using the image. Generally, the image is positioned at a predetermined offset within the page background. The predetermined offset is used to align the image and the table so that the element is accurately plotted on the image regardless of the browsing software used. Some browsing software supports programmable page margins while other browsing software only supports fixed page margins. For browsing software which supports programmable page margins, the page margins are set to the predetermined offset so that the upper left hand corner of the table begins at the same point as the upper left hand corner of the image. For browsing software which supports only fixed page margins, the fixed page margins must be equal to the predetermined offset so that the upper left hand corner of the table begins at the same point as the upper left hand corner of the image.

If the page background is displayed in a framed environment, then the predetermined offset is set to the page margins of the framed page. In a framed environment, an HTML page is divided into rows and columns of individual frames. Each frame displays an independent document. The page background for plotting an element on an image is displayed in one of the individual frames.

Once the image is positioned on the page background, the area outside of the image is filled with a background filler. The background filler in the preferred embodiment is a solid color. Once the page background is complete, the server saves the page background as a GIF file.

Preferably, the server also creates an HTML table containing the element. The element data used to create the table may be stored in a remote memory storage device. The server downloads the element data and uses the element data to create the table. A sample HTML table for overlaying a hotel icon on a map is shown in Table 1. The table is borderless with cell spacing and cell padding set to zero. Borders, cell spacing and cell padding add space between cells and between the edge of a cell and the cell content. Borders, cell spacing and cell padding are not used because the additional space would interfere with the positioning of the element in the table. The width of the table is defined to be equal to the width of the image (ImageWidth) and the height of the table is defined to be equal to the height of the image (ImageHeight). The plotting coordinates for the hotel are X and Y. The horizontal coordinate is X and the vertical coordinate is Y. The SRC attribute specifies the URL for an image. SPACEIT.GIF is a single pixel transparent GIF file.

HOTELICON.GIF is the GIF file for the hotel icon. The width of the hotel icon is dxIcon and the height of the hotel icon is dyIcon. The name of the hotel appears for HOTEL_NAME in the element label table in the third row. The element label table cell has a solid background color so that the hotel name stands out against the map.

TABLE 1

```
<TABLE WIDTH=ImageWidth HEIGHT=ImageHeight
CELLSPACING=0 CELLPADDING=0 BORDER=0>
<TR>
<TD WIDTH=xBuffer HEIGHT=yBuffer><IMG
WIDTH=xBuffer HEIGHT=yBuffer
SRC="SPACEIT.GIF"></TD>
<TD><TD>
<TD WIDTH=100%></TD>
</TR>
<TR>
<TD></TD>
<TD WIDTH=dxIcon HEIGHT=dyIcon VALIGN=TOP><IMG
WIDTH=dxIcon HEIGHT=dyIcon
SRC="HOTELICON.GIF"></TD>
</TR>
<TR>
<TD></TD>
<TD HEIGHT=yBuffer2 VALIGN=TOP>
<TABLE CELLSPACING=0 CELLPADDING=0 BORDER=0>
<TR>
<TD NOWRAP BGCOLOR=RGB1><FONT
COLOR=RGB2><B><HOTEL NAME</B></FONT></TD>
</TR>
</TABLE>
</TD>
<TD></TD>
</TR>
</TABLE>
xBuffer=greater of 0 and X − (dxIcon/2)−1
yBuffer=greater of 0 and Y − (dyIcon/2)−1
yBuffer2=ImageHeight − yBuffer -dyIcon
```

The client downloads and caches the GIF file for the page background from the server. The client also downloads the HTML table from the server. The client displays the page background and the table using browsing software. The page background is displayed by specifying the page background GIF file in the background attribute in the body of the document. An example of the background attribute used in connection with the <BODY> tag is shown in Table 2. The page background GIF file in Table 2 is "PG_BKGND.GIF." The table is displayed by specifying the <TABLE> tag of Table 1 in the body of the HTML document.

TABLE 2

```
<BODY BACKGROUND="PG_BKGND.GIF">
```

A series of elements may be plotted on the image without regenerating the page background. To plot a first element and then a second element on the image, a second table is created using the plotting coordinates for the second element. The creation of the second table follows the steps described above for creating a table containing an element. To plot the second element on the image, the table containing the first element is removed and the table containing the second element is displayed.

Figure 8:
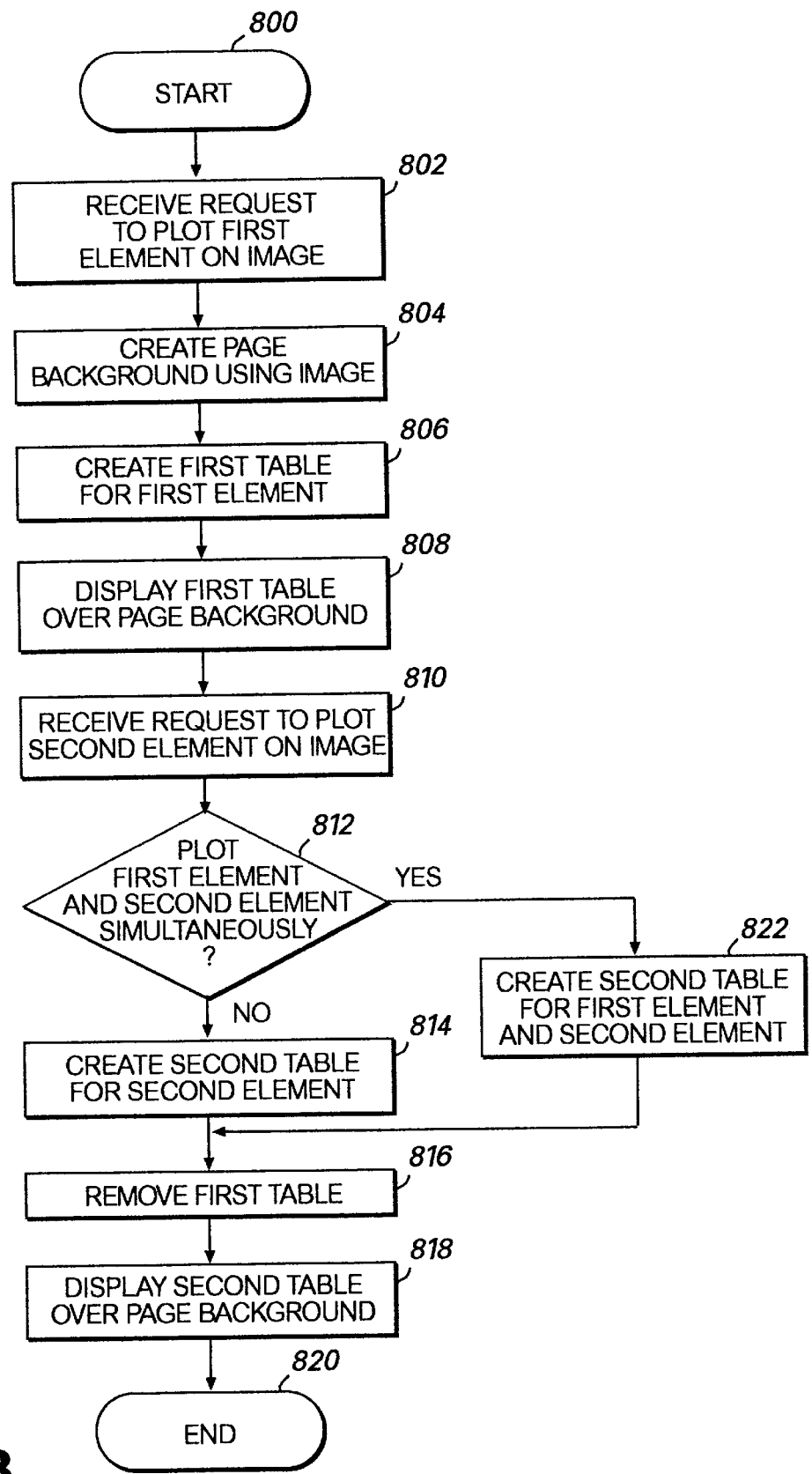
FIG. 8 is a logical flow diagram illustrating the steps for plotting a second element on the image using a table.

FIG. 8 is a logical flow diagram illustrating the steps for plotting a first element and then a second element on an image using a table and a page background. The method begins at the START task of step 800. The method proceeds to receive a request to plot a first element on the image in step 802. In step 804, a page background is created using the image. The steps for creating a page background are illustrated in FIG. 6 and are described above. In step 806, a first table containing the first element is created. The steps for creating the first table containing the first element are illustrated in FIG. 7 and are described above. After the page background and the first table are created, the method proceeds to display the first table over the page background in step 808. Displaying the first table over the page background overlays the first element on the image, plotting the first element on the image.

In step 810, a request to plot a second element on the image is received. The second element is different than the first element, but the image is the same. A determination is made in step 812 as to whether the request of step 810 is a request to plot only the second element or a request to plot both the first element and the second element. If the determination is that the request is a request to plot only the second element then the NO branch is followed from step 812 to step 814. A second table for the second element is created in step 814. The second table for the second element is created using the steps illustrated by FIG. 7 and described above. In step 816, the first table containing the first element is removed so that the first element is removed from the image. The second element is plotted on the image by overlaying the second table for the second element on the page background in step 818. The method then terminates at the END task of step 820.

In addition to plotting a series of elements on the image, multiple elements may be plotted on the image simultaneously. If the determination in step 812 is that the request of step 810 is a request to simultaneously plot the first element and the second element then the YES branch is followed to step 822. In step 822, a second table containing the first element and the second element is created. The second table is more complex than the first table because in addition to positioning two elements on an image, the second table must also handle potentially overlapping elements and element labels. The single element table described above may be extended to handle multiple elements. One possible extension may include adding an additional element row and an addition element label row, adjusting the first and second buffer rows and adding an additional buffer row. Other possible extensions will be apparent to those skilled in the art. Once the second table is created, the first table containing the first element is removed in step 816. The first element and the second element are plotted on the image by overlaying the table containing the first element and the second element on the page background in step 818. The END task terminates the method at step 820.

Dynamically Plotting an Element on an Image Using a Table and Table Background

The second embodiment for dynamically plotting an element on an image uses a table and a table background. Both the table and the table background are part of a page of a hypertext-enabled document. In the second embodiment, the page background is not used to plot an element on an image and is preferably a solid color.

To create a table and a table background using the second embodiment, the background of the table is defined to be the image. The table is transparent so that the table background is displayed through the empty cells of the table. Only the items contained in the cells of the table are displayed over the image. Preferably, the table is the same as that shown in FIG. 3 and described above in connection with the first embodiment, except that the image is defined to be the background of the table.

The second embodiment for plotting an element on an image may also be implemented in a networked environment using a personal computer 20 operating as a client and a remote computer 49 operating as a server. Preferably, the server creates the table using HTML. The second embodiment is operable with browsing software which supports HTML tables with an image as a background for the entire table. An example of browsing software which supports a table with an image as a background is the "INTERNET EXPLORER 3.0" program marketed by Microsoft Corporation of Redmond Wash.

Preferably the table is created as an HTML table. The image used for the background of the table is specified in a BACKGROUND attribute for the table. The image is accessed via a hyperlink. Otherwise the HTML table is similar to the HTML table constructed for the first embodiment. A sample HTML table using a map as a table background is shown in Table 3. The map is a GIF file entitled MAP.GIF.

TABLE 3

```
<TABLE WIDTH=ImageWidth HEIGHT=ImageHeight
CELLSPACING=0 CELLPADDING=0 BORDER=0>
BACKGROUND="MAP.GIF">
<TR>
<TD WIDTH=xBuffer HEIGHT=yBuffer><IMG
WIDTH=xBuffer HEIGHT=yBuffer
SRC="SPACEIT.GIF"></TD>
<TD><TD>
<TD WIDTH=100%></TD>
</TR>
<TR>
<TD></TD>
<TD WIDTH=dxIcon HEIGHT=dyIcon VALIGN=TOP><IMG
WIDTH=dxIcon HEIGHT=dyIcon
SRC="HOTELICON.GIF"></TD>
</TR>
<TR>
<TD></TD>
<TD HEIGHT=yBuffer2 VALIGN=TOP>
<TABLE CELLSPACING=0 CELLPADDING=0 BORDER=0>
<TR>
<TD NOWRAP BGCOLOR=RGB1><FONT
COLOR=RGB2><B><HOTEL NAME</B></FONT></TD>
</TR>
</TABLE>
</TD>
<TD></TD>
</TR>
TABLE>
xBuffer=GREATER OF 0 AND X – (ICONWIDTH/2)–1
yBuffer=GREATER OF 0 AND Y – (ICONHEIGHT/2)–1
yBuffer2=ImageHeight – yBuffer – dyIcon
```

The client downloads the table from the server and the client displays the table, including the table background, on a display device. The download time for the second embodiment is less than the download time for the first embodiment because the second embodiment downloads a 450×375 image whereas the first embodiment downloads a 1024× 1024 image. In addition, the amount of time required for the client to render the image is less for the second embodiment than for the first embodiment because the client is rendering a smaller image. Once the client downloads the image, the client caches the image. The amount of client memory needed to cache the image in the second embodiment is less than the amount of client memory needed to cache the image in the first embodiment. In the first embodiment, the client caches the entire 1024×1024 page background, whereas in the second embodiment, the client only caches the 450×375 image.

FIG. 9 is a logical flow diagram illustrating the steps of plotting an element on an image using a table and a table background. The method begins at the START task of step 900 and proceeds to step 902 to receive a request to plot an element on an image. In step 904, a table, including a table background using the image is created. The size of the table is selected so that the table is the same size as the image. The table contains a first buffer row, an element row and a second buffer row. An element label may be displayed in the second buffer row. The steps for creating a table containing the element are illustrated by FIG. 7 and are described above.

Once the table is created, the method returns to FIG. 9, where in step 906 the table is displayed. The method for plotting an element on an image using a table and a table background terminates at the END task of step 908.

The present invention has been described in relation to particular embodiments which are intended in all respects to be illustrative rather than restrictive. Those skilled in the art will understand that the principles of the present invention may be applied to, and embodied in, various program modules for execution on different types of computers regardless of the formats used for the table and the background.

Alternative embodiments will become apparent to those skilled in the art to which the present invention pertains without departing from its spirit and scope. Accordingly, the scope of the present invention is described by the appended claims and is supported by the foregoing description.

What is claimed is:

1. A method for dynamically plotting an element on an image, comprising the steps of:

receiving plotting coordinates for the element;

receiving the image and dimensions for the image;

creating a page background using the image; creating a table containing the element; and displaying the table over the page background so that the element is plotted on the image.

2. The method of claim 1, wherein the step of creating a page background using the image comprises:

positioning the image at a predetermined offset within the page background; and filling the page background outside of the image with background filler.

3. The method of claim 1, wherein the step of creating a table comprises:

creating a first buffer row;

creating an element row, the element row located below the first buffer row; and creating a second buffer row, the second buffer row located below the element row.

4. The method of claim 3, wherein the plotting coordinates comprise a horizontal coordinate and a vertical coordinate and wherein the step of creating a first buffer row comprises:

creating a first cell of the first buffer row, the first cell having a width determined by the horizontal coordinate and a height determined by the vertical coordinate; and displaying a transparent character in the first cell.

5. The method of claim 3, wherein the step of creating an element row comprises:

creating a second cell of the element row; and displaying the element in the second cell.

6. The method of claim 3, wherein the plotting coordinates comprise a vertical coordinate, wherein the dimensions for the image comprise an image height, and wherein the height of the second buffer row is determined by the image height and the vertical coordinate.

7. The method of claim 1, further comprising the step of plotting a second element on the image by:

receiving plotting coordinates for the second element;

creating a second table containing the second element; and using the second table to overlay the second element on the image.

8. The method of claim 7 further comprising the step of removing the table before the step of using the second table to overlay the second element.

9. The method of claim 7, wherein the plotting coordinates for the second element comprise a horizontal coordinate and a vertical coordinate and the dimensions for the image comprise an image height, and wherein the step of creating a second table comprises the steps of:

creating a first cell of a first buffer row, the first cell of the first buffer row having a width determined by the horizontal coordinate of the second element and a height determined by the vertical coordinate of the second element;

displaying a transparent character in the first cell of the first buffer row;

creating a second cell of an element row;

displaying the second element in the second cell of the element row; and creating a second buffer row, the second buffer row having a height determined by the difference between the image height and the vertical coordinate of the second element.

10. The method of claim 1, wherein the page background and the table are created by a server and transferred to a client for display by the client.

11. The method of claim 10, wherein the page background is cached in memory by the client.

12. A computer-readable medium having computer executable instructions for dynamically plotting an element on an image, comprising the steps of:

(a) receiving a horizontal coordinate and a vertical coordinate for the element;

(b) receiving the image and an image height (c) creating a page background using the image by
 (i) positioning the image at a pre-determined offset within the page background; and
 (ii) filling an area of the page background outside of the image with a background filler;

(d) (d) creating a table to position the element on the image, the table having a first buffer row, an element row and a second buffer row; and displaying the table over the page background so that the element is plotted on the image.

(e) displaying the table over the page background so that the element is plotted on the image.

13. The computer-readable medium of claim 12, wherein the step of creating a table comprises the steps of:

creating a first cell of the first buffer row, the first cell of the first buffer row having a width determined by the horizontal coordinate of the element and a height determined by the vertical coordinate of the element;

creating a second cell of the element row;

displaying the element in the second cell of the element row;

creating a second cell of the second buffer row having a height determined by the difference between the image height and the vertical coordinate of the element; and displaying a label for the element in the second cell of the second buffer row.

14. A method for dynamically plotting an element on an image for display, comprising the steps of:

receiving plotting coordinates for the element;

creating a table containing the element;

receiving the image;

using the image as a table background; and displaying the table including the table background.

15. The method of claim 14, wherein a server receives the image and the plotting coordinates for the element;

the server creates the table and the table background;

the server transfers the table and the table background to a client; and the client displays the table and the table background.

16. The method of claim 14, wherein the element has an element height and an element width;

the image has an image height and an image width; and the plotting coordinates comprise a horizontal coordinate and a vertical component.

17. The method of claim 16, wherein the step of creating a table comprises the steps of:

creating a first cell of a first buffer row of the table, the first cell having a width determined by the horizontal coordinate of the element and a height determined by the vertical coordinate of the element;

creating a third cell of the first buffer row, the third cell having a width determined by the image width and the horizontal coordinate of the element; and displaying a transparent character in the first cell of the first buffer row.

18. The method of claim 16, wherein the step of creating a table further comprises the steps of:

creating a second cell of an element row of the table; and displaying the element in the second cell of the element row.

19. The method of claim 16, wherein the element label has an element label height, and wherein the step of creating a table further comprises the steps of:

creating a second cell of a second buffer row of the table, the second cell having a height determined by the difference between the image height and the vertical coordinate of the element, minus the element height; and displaying an element label table containing an element label in the second cell of the second buffer row.

* * * * *